3,849,460
PREPARATION OF TRINEOPHYLTIN HALIDES
David A. Daniels, Kendall Park, and William R. Davis, South Plainfield, N.J., assignors to M & T Chemicals Inc., Greenwich, Conn.
No Drawing. Filed June 11, 1973, Ser. No. 368,813
Int. Cl. C07f 7/22
U.S. Cl. 260—429.7          3 Claims

ABSTRACT OF THE DISCLOSURE

This invention relates to an improved method for preparing trineophyltin chloride or bromide in high yield and purity by adding a stannic halide to an ether solution of a neophylmagnesium halide wherein the improvement resides in maintaining the temperature of the reaction mixture at between 55 and 65° C. for the duration of the reaction period and isolating the resultant solid trineophyltin halide. The compound has utility as a miticide.

BACKGROUND

This invention pertains to a novel method for preparing triorganotin compounds. More particularly, this invention pertains to a method characterized by high yields of trineophyltin halides containing less than 3% by weight of combined mono-, di- and tetraneophyltin compounds and hexaneophyl ditin.

Prior attempts to prepare triorganotin halides by the addition of a stannic halide to an ether solution of an alkylmagnesium halide have yielded mixtures of products containing major amounts of the tetraalkyltin derivative. This is understandable since the large excess of alkyl magnesium halide present in the initial reaction mixture would favor replacement of all four halogen atoms on the tin atom by alkyl groups even though one mole of stannic halide is added for every three moles of alkyl magnesium halide. This is true even when the alkyl group is a relatively hindered one such as the neophyl radical represented by the formula

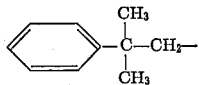

and the reaction with a stannic halide is carried out at temperatures above 65° C. At temperatures below 55° C. a substantial amount of the corresponding dineophyltin halide is obtained. It has been found that the product distribution resulting from the addition of a stannic halide to a neophylmagnesium halide is dependent upon the temperature of the reaction mixture during and following the addition. By maintaining a reaction temperature of between 55 and 65° C. from the time the addition of the stannic halide is begun until the reaction mixture is hydrolyzed one can achieve yields of trineophyltin halides in excess of 98% and with only minor amounts of the corresponding mono-, di- and tetrasubstituted products.

SUMMARY OF THE INVENTION

This invention provides an improved method for preparing trineophyltin chloride or bromide in high yield and purity by (1) the addition of a stannic chloride or bromide to an ether solution of neophylmagnesium chloride or bromide, the molar ratio of the stannic compound to the neophylmagnesium compound being about 1:3, respectively,
(2) hydrolyzing the resultant reaction mixture, and
(3) isolating the solid trineophyltin chloride or bromide, wherein the improvement resides in maintaining the temperature of the reaction mixture between 55 and 65° C. during the addition of the stannic chloride or bromide and until the reaction between the stannic halide and neophylmagnesium halide is substantially complete.

For the purpose of simplicity, the term "halide" will be employed hereinafter to designate either chloride or bromide.

DETAILED DESCRIPTION OF THE INVENTION

The Grignard reagent, neophylmagnesium halide, used as one of the starting materials in the present method is conveniently prepared by reacting the corresponding neophyl halide with magnesium in the presence of an aliphatic or cyclic ether exhibiting a melting point below 65° C. Suitable cyclic ethers contain a 5- or 6-membered ring and can be represented by the general formula

wherein X is selected from the group consisting of methylene and N-alkyl radicals, $R^1$ is an unsubstituted divalent hydrocarbon rdical; $R^2$ is selected from the group consisting of the ethylene radical, ethylenically unsaturated divalent hydrocarbon radicals, the methylene radical and $>CHR^3$ wherein $R^3$ is selected from hydrogen and aliphatic hydrocarbon radicals, with the proviso that when X represents an N-alkyl radical the ring contains 6 members and O and X occupy the 1 and 4 positions of the ring with respect to one another.

Cyclic ethers within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. The ether may bear as substituent inert groups, i.e., groups which are not reactive with organomagnesium halides or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

The oxygen atom is available for electron donation, i.e., the free π-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above, other equivalent compounds satisfying the requirements for this complexing agent and solvent will be apparent to those skilled in the art from the present specification.

The neophylmagnesium halide is preferably in the form of a solution of its complex with the ether. For purpose of convenience, the equations herein are written without including the ether.

The reaction between the neophyl halide and magnesium is preferably conducted under an inert atmosphere such as nitrogen to exclude even trace amounts of water. The conditions required to obtain optimum yields of organomagnesium compounds are well known and do not constitute a part of the present invention.

The ether solution containing the neophylmagnesium halide is preferably used directly for reaction with the stannic halide without any intervening processing steps other than filtration to remove any unreacted magnesium or other insoluble material.

The overall reaction between the stannic halide and neophyl magnesium halide can be represented by the equation

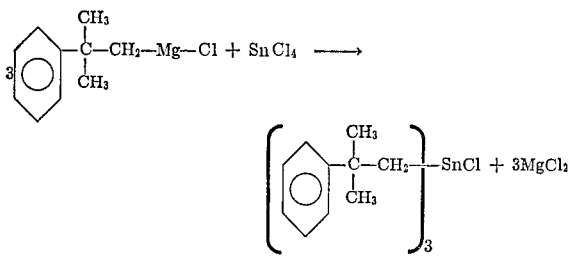

Alternatively, all of the chlorine atoms of the Grignard reagent and stannic chloride in the foregoing formula can be replaced by bromine to obtain the corresponding trineophyltin bromide.

In accordance with the present invention the stannic halide is gradually added to a stirred ether solution of the neophyl magnesium halide at a rate which will permit the temperature of the reaction mixture to be maintained at between 55 and 65° C. The reaction is exothermic, and occasional or continuous external cooling of the reaction vessel may therefore be necessary to keep the temperature within the critical range. The stannic halide is preferably added as a solution in a liquid hydrocarbon that boils between 65 and 200° C. and contains between 6 and about 20 carbon atoms. Suitable hydrocarbons include aliphatic, cycloaliphatic and aromatic hydrocarbons and are represented by hexane, cyclohexane, eicosane, benzene and the various alkylated benzenes such as toluene and the isomeric xylenes.

The presence of the hydrocarbon solvent for the stannic halide serves to moderate the reaction between the tin compound and the Grignard reagent. In addition the hydrocarbon serves to maintain the viscosity of the reaction mixture at a desirably low level. A mixture of a stannic halide and an ether exhibits a viscosity which is characteristic of an organic polymer solution. This increased viscosity is believed due to the formation of a complex between the stannic halide and the ether solvent of the Grignard reagent. The high viscosity introduces the danger of localized overheating due to poor heat transfer within the reaction mixture. The concentration of the stannic halide in the hydrocarbon solution is preferably between 10 and 50% by weight.

Following completion of the stannic halide addition the reaction mixture is maintained at between 55 and 65° C. for from 1 to 2 hours to ensure a complete reaction between the Grignard compound and the stannic halide. External heating may be required to maintain the temperature at the desired level once the exothermic phase of the reaction has ended.

The trineophyltin halide product is isolated by hydrolyzing the reaction mixture using a dilute aqueous solution of hydrochloric or hydrobromic acid, depending upon the anionic portion of the organotin product. The acid is preferably present at a concentration of between 1 and 15% by weight and the amount of water is at least 12 times the required stoichiometric amount, based on the number of moles of Grignard reagent employed. Alternatively, the water may be added first, followed by the acid. The solid trineophyltin halide is soluble in the organic phase of the resultant two-phase mixture, which is then separated from the aqueous portion by any suitable means and concentrated to precipitate the product.

The yield of trineophyltin halide is often 97% or more of the theoretical value, and contains no more than about 3% by weight of by-products, which are mainly the corresponding di- and tetraneophyltin compounds.

If greater purity is desired the product can be distilled under reduced pressure.

EXAMPLES

The following example demonstrates a preferred embodiment of this invention and should not be interpreted as limiting the scope thereof either with regard to reagents or reaction conditions

*Neophylmagnesium chloride* was prepared by placing 55.8 parts magnesium turnings, 20 parts neophyl chloride, 28 parts tetrahydrofuran and 4.4 parts of a previously prepared sample of neophyl magnesium chloride in a reaction vessel equipped with agitator, thermometer, reflux condenser, addition funnel and means for maintaining a positive pressure of nitrogen within the reaction vessel. The contents of the vessel were heated to reflux temperature for about 2 minutes after which a solution containing 398 parts of neophyl chloride and 529 parts tetrahydrofuran was gradually added over a period of 1 hour. The temperature of the reaction mixture remained at between 83 to 86° C. without external heating. Following completion of the neophyl chloride addition the reaction mixture was heated to reflux temperature for 2 hours, then allowed to cool to ambient temperature.

Preparation of trineophyltin chloride

To 980 parts of the aforementioned solution of neophylmagnesium chloride maintained under a nitrogen atmosphere was added a solution containing 190 parts anhydrous stannic chloride and 570 parts of dry xylene. The addition required 60 minutes, during which time the temperature of the reaction mixture was maintained at between 60 and 65° C. using external cooling as required. Following completion of the addition, external heating was applied for 1 hour to maintain the reaction mixture temperature at between 60 and 65° C. The reaction mixture was then allowed to cool to 35° C., after which it was added over a period of 10 minutes to a mixture containing 512 parts each of ice and water and 143 parts of concentrated (12 N) aqueous hydrochloric acid. The resultant mixture was stirred for 30 minutes under ambient conditions. The organic portion of the resultant mixture was isolated, filtered and concentrated by distillation of solvent under ambient conditions. Upon analysis by vapor phase chromatography an aliquot portion of the resultant solution was found to contain the following distribution of organotin compounds: 98.8% trineophyltin chloride, 0.8% tetraneophyltin and 0.4% dineophyltin dichloride. The solid material melted at 117° C. The reported melting point of trineophytin chloride is 115–7° C. The total tin content of the three organotin compounds was equal to the tin content of the stannic chloride within experimental error.

The following example demonstrates the increased amount of undesirable by-products formed when the reaction temperature is outside the present limits of 55 to 65° C.

A solution containing 196 parts of stannic chloride and 570 parts of dry toluene was added to 990 parts of a solution of neophylmagnesium chloride prepared as described in the first section of the preceding example. The addition required 85 minutes, during which time the temperature of the reaction mixture was maintained between 45 and 50° C. This temperature range was maintained for an additional 2 hours. The reaction mixture was hydrolyzed and concentrated as described in the preceding example. Analysis by vapor phase chromatography revealed the following product distribution:

Trineophyltin chloride—96.7%.
Dineophyltin dichloride—3.3%.
No tetraneophyltin detected.

By decreasing the reaction temperature by 5 to 10° from the present limits, the relative amount of dineophyltin dichloride increased eight fold (from 0.4 to 3.3%). Mixtures of di- and trineophyltin compounds are extremely difficult to separate. The presence of the dineophyl compounds may make the product unsuitable for those uses where toxicity is an important consideration, since dineophyltin dichloride is considerably more toxic than trineophyltin chloride.

When the reaction between stannic chloride and neophylmagnesium chloride was repeated using the amounts of reagents specified in the first example and a reaction temperature of between 70 and 80° C. the following product distribution was obtained:

Trineophyltin chloride—95.1%.
Tetraneophyltin—4.7%.
No detectable amount of dineophyltin dichloride.

The conversion of stannic chloride to organotin compounds was 98.3%.

Increasing the minimum reaction temperature to 75° C. with the upper limit at 80° C. reduced the overall yield to 98.7%, the relative amount of trineophyltin chloride to 93.1% and increased the relative amount of tetraneophyltin to 6.9%.

What is claimed is:

1. In a method for preparing trineophyltin halides,

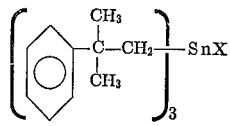

in high yield and purity, said method consisting of the following steps:
(1) adding a hydrocarbon solution of a stannic halide, $SnX_4$ to an ether solution of a neophyl magnesium halide

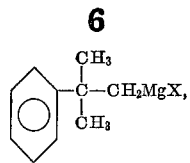

(2) hydrolyzing the resultant reaction mixture using an aqueous solution of an acid HX, and
(3) concentrating the organic portion of the resultant two-phase liquid to isolate the trineophyltin halide, wherein X represents chlorine or bromine, the improvement of which consists of maintaining the temperature of the reaction mixture at between 55 and 65° C. during the addition of said stannic halide and until the time at which the reaction between the stannic halide and neophyl magnesium halide is substantially complete.

2. The method of claim 1 wherein X represents chlorine.

3. The method of claim 1 wherein the hydrocarbon is xylene.

References Cited

UNITED STATES PATENTS

| | | | |
|---|---|---|---|
| 3,657,451 | 4/1972 | Horne | 260—429.7 |
| 3,754,012 | 8/1973 | Bulten | 260—429.7 |

OTHER REFERENCES

Reichle: Inorg. Chem. 5 (1966), pp. 87-91.

DANIEL E. WYMAN, Primary Examiner

A. P. DEMERS, Assistant Examiner

U.S. Cl. X.R.

260—665 G